Figure 1:
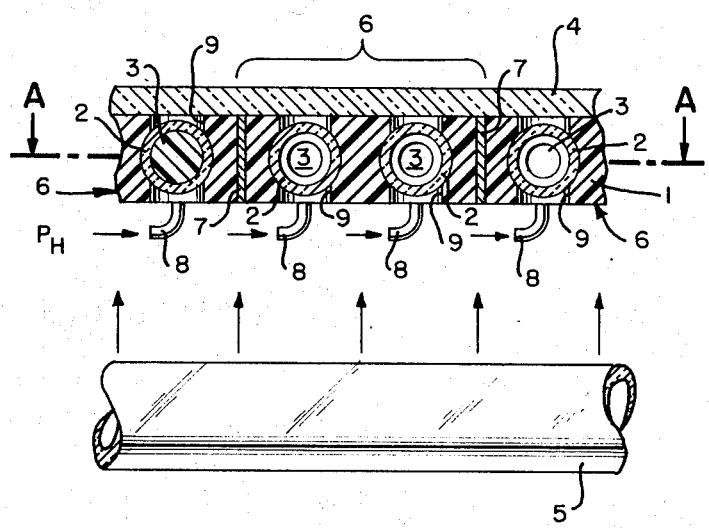

United States Patent

[11] 3,530,821

| [72] | Inventors | Helfried Bilz, Kleinmachnow; |
| | | Kleinmachnow, |
| | | Jürgen Voigt, Dresden; |
| | | Wolfgang Göbel, Moritzburg; |
| | | Christian Hahn, Dresden; |
| | | Rainer Emmrich, Braunsdorf, Germany |
| [21] | Appl. No. | 792,741 |
| [22] | Filed | Jan. 21, 1969 |
| [45] | Patented | Sept. 29, 1970 |
| [73] | Assignee | Veb Reglerwerk Dresden, |
| | | Dresden, Germany |

[54] PRESSURE ACTUATED INDICATOR DEVICE FOR BINARY PRESSURE SIGNALS
3 Claims, 2 Drawing Figs.

[52] U.S. Cl. ..................................... 116/70,
  116/65, 250/231
[51] Int. Cl. ...................................... G01l 19/12
[50] Field of Search ............................ 116/65, 70,
  117, 114; 235/201; 137/81.5; 250/230, 231;
  73/209, 229, 266

[56] References Cited
UNITED STATES PATENTS

| 2,808,580 | 10/1957 | Fuller............................ | 73/209UX |
| 3,109,065 | 10/1963 | McNaney...................... | 250/227X |
| 3,210,757 | 10/1965 | Jacob............................ | 350/266 |
| 3,300,769 | 1/1967 | Batur............................ | 116/70UX |
| 3,305,171 | 2/1967 | Phillips et al. ................ | 73/209X |
| 3,450,341 | 6/1969 | Render et al. ................ | 235/201 |
| 3,463,931 | 8/1969 | Kormos........................ | 250/231 |

*Primary Examiner*—Louis J. Capozi
*Attorney*—Nolte and Nolte

ABSTRACT: A flat opaque body is provided with a plurality of light passages and covered at one side with a display screen. At the opposite side of the body, a light source is arranged for transmitting light through the passages. Each passage is provided with a movable opaque piston disposed within a transparent cylinder. The light passing position of the piston is set by the pressure of a signal fluid introduced into the cylinder through a separate pressure inlet, and the light blocking position is reset by separate reset means.

INVENTORS
HELFRIED BILZ
JÜRGEN VOIGT
WOLFGANG GÖBEL
CHRISTIAN HAHN
RAINER EMMRICH

BY Nolte & Nolte
ATTORNEYS

PRESSURE ACTUATED INDICATOR DEVICE FOR BINARY PRESSURE SIGNALS

The present invention relates generally to luminous indication of binary pressure signals.

In particular, the present invention relates to a pressure actuated indicator device which can be employed for displaying and signalling, in the form of a luminous pattern, binary pressure conditions in a control and regulation equipment.

There have been already known devices displaying optical characters, signs or other symbols. The latter characters or signs have been associated with pneumatically or hydraulically actuated pistons, respectively. A pressure fluid introduced to each piston through a separate pressure channel has selectively controlled the movement of the characters or signs.

Such conventional indicator devices have the disadvantage residing in that they are not convenient for displaying the characters or signs in the form of luminous patterns, as it is frequently required for controlling the operation of control and regulation equipments.

Another known embodiment of the indicator device which can be utilized, either separately or in combination with other elements, in equipment operating with other magnitudes than the pressure of a fluid, are actuated by mechanical or electromagnetical means, such as, for example, by a bimetal strip or by an electromagnet. These known devices for the optical indication of binary signals comprise a chamber which is provided with a viewing window. A body or piston is movably arranged within the chamber and secured to a position restoring means. An optically effective liquid is by the effect of the force acting on the movable body either introduced into or removed from the space between the viewing window and a visible surface portion of the movable body, thereby covering or uncovering the latter visible portion.

The indicators of the aforementioned kind are very susceptible to failure and also inconvenient for the display on a luminous indication pattern or panel.

All of the remaining known devices for the indication of binary signals operate by the aid of electronic data processing methods which require transducing means when employed in pneumatic equipments. The application of electropneumatic transducers, however, brings about considerably increased size and cost of the indicator devices.

The primary object of the present invention is, therefore, to remove the disadvantages of prior art indicator devices.

Another object of the present invention is to provide a small indicator device which is reliable in operation.

A further object of the present invention is to provide a pressure actuated binary indicator which makes it possible to display a plurality of combinations of pressure conditions on a single display screen and which can be assembled into a raster or modular frame.

According to the present invention, the above objects are attained by arranging a pressure actuated element in such a manner that a ray of light incoming from a stationary light source is either blocked or passed through.

The light blocking element is either an opaque piston movably disposed within a transparent cylinder, a slide member movably arranged across an aperture, or a shutter of a diaphragm. The structural dimensions and arrangement of respective elements are accommodated for the illumination from a single light source and for the display of the passed light rays on a common display screen.

Figure 2:
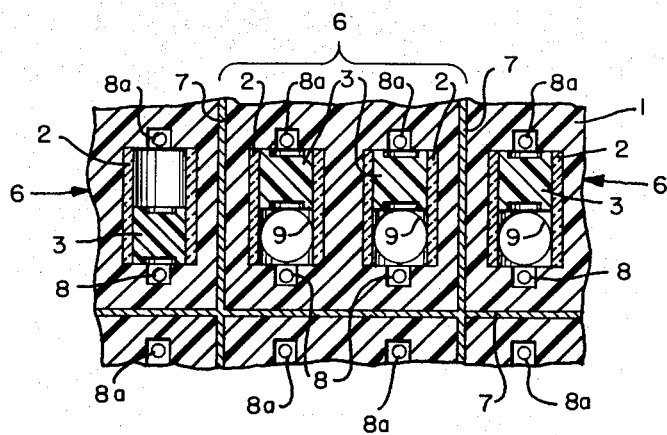

A preferred embodiment of the present invention will now be in more detail described with reference to accompanying drawings wherein:

FIG. 1 is a plan view of a section of the indicator device of this invention; and FIG. 2 is a rear sectional view of the device of FIG. 1 taken on line A–A.

With reference to figures, the entire indicator device is preferably made up of a plurality of indicator modules 6 regularly arrayed within frame 7. Each module 6 has flat body 1 of opaque plastic or elastomer material and is provided with two spaced bores 9 for allowing the light to pass from light source 5 to semitransparent display screen 4 arranged adjacent to one side of the indicator body 1. Within each bore 9 transparent hollow cylinder 2 with opaque piston 3 are disposed transversely to the light passage. The movement of piston 3 to its upper position within the cylinder is controlled by the pressure PH of a signal fluid which is introduced into cylinder 2 through signal fluid pipe 8 arranged at the bottom base of the cylinder. At the top base, reset fluid pipe 8a is provided to introduce a counter pressure which rapidly restores the initial position of pistons 3 when the pressure PH of the signal fluid decreases below a predetermined level.

Since bores 9 are situated at the lower portion of cylinder 2 the light passage is blocked or stopped at the lower position of piston 3 and unblocked at the upper position of the latter. When the light passes through the bore, it makes a luminous spot on the display screen 4, thus signalling in a binary operational mode the pressure condition in the pertaining signal fluid pipe. Instead of fluid pipes, it is possible, of course, to control the movement of piston 3 by other means, such as, for example, by an electromagnet or by a mechanical force.

The display screen which covers the entire array of indicator modules makes it possible to display in the form of discrete luminous patterns two predetermined states in a plurality of pressure channels and thereby to oversee the processes in a control and regulation system from one survey station.

We claim:

1. Pressure actuated indicator device for binary pressure signals, comprising a flat opaque body, a plurality of light passages formed in said body, light source at one side of the body and a display screen supported adjacent to the opposite side of said body, and pressure actuated light stop means associated with each of said light passages to pass the light from said light source onto said display screen when a respective imput pressure exceeds a predetermined value, said light stop means including a transparent hollow cylinder, an opaque piston movably positioned in said hollow cylinder, said cylinder being disposed across the light passage, pressure inlet means for introducing a signal fluid into the cylinder to control the movement of said piston into a light passing position, and fluid reset means communicating with the interior of the cylinder for returning said piston into a light stopping position.

2. Pressure actuated indicator device according to claim 1 wherein said reset means is a pressure fluid inlet arranged at the top portion of the cylinder and adapted to introduce a resetting pressure for said piston.

3. Pressure actuated indicator device according to claim 1 wherein said body is assembled of a number of uniform modules, each of said modules having a number of light passages and being arranged within a frame means.